United States Patent [19]

Schwuttke et al.

[11] Patent Number: 5,226,110

[45] Date of Patent: Jul. 6, 1993

[54] PARALLEL INFERENCING METHOD AND APPARATUS FOR RULE-BASED EXPERT SYSTEMS

[75] Inventors: Ursula M. Schwuttke, Arcadia; Dan Moldovan, Redondo Beach; Steve Kuo, Sepulveda City, all of Calif.

[73] Assignee: The United States of America as represened by the Administrator of the National Aeronautics and Space Administration, Washington, D.C.

[21] Appl. No.: 677,059

[22] Filed: Mar. 29, 1991

[51] Int. Cl.⁵ .............................................. G06F 15/18
[52] U.S. Cl. ......................................... 395/11; 395/51
[58] Field of Search ...................... 395/11, 51; 364/513

[56] References Cited

U.S. PATENT DOCUMENTS

| | | | |
|---|---|---|---|
| 4,754,409 | 6/1988 | Ashford et al. | 364/513 |
| 4,763,277 | 8/1988 | Ashford et al. | 364/513 |
| 4,783,752 | 11/1988 | Kaplan et al. | 364/513 |
| 4,809,219 | 2/1989 | Ashford et al. | 364/900 |
| 4,837,735 | 6/1989 | Allen, Jr. et al. | 364/513 |
| 4,847,784 | 7/1989 | Clancey | 364/513 |
| 4,849,905 | 7/1989 | Loeb et al. | 364/513 |
| 4,868,763 | 9/1989 | Masui et al. | 364/513 |
| 4,965,882 | 10/1990 | Barabash et al. | 364/513 |

FOREIGN PATENT DOCUMENTS 2207531  2/1989  United Kingdom .

OTHER PUBLICATIONS

Hwang et al., "A Parallel Architecture for Large Scale Production Systems", Tools for Artificial Intelligence, Oct. 1989, 27-33.

Gupta et al., "Parallel OPS5 on the Encore Multimax," Proc. Intl. Conf. on Parallel Processing, 1988, 271-280.

Moldovan, D. I., "RUBIC: A Multiprocessor for Rule-Based Systems", Trans. Systems, Man, and Cybernetics, vol. 19(4), 1989, 699-706.

Moldovan et al., "Minimal State Space Search in Production Systems", Tech. Rept. CRI-87-19, Univ. So. California, Jan. 1987.

Primary Examiner—Michael R. Fleming
Assistant Examiner—Robert W. Downs
Attorney, Agent, or Firm—John H. Kusmiss; Thomas H. Jones; Guy M. Miller

[57] ABSTRACT

The invention analyzes areas of conditions with an expert knowledge base of rules using plural separate nodes which fire respective rules of said knowledge base, each of said rules upon being fired altering certain of said conditions predicated upon existence of others of said conditions, the invention operating by constructing a P representation of all pairs of said rules which are input dependent or output dependent; constructing a C representation of all pairs of said rules which are communication dependent or input dependent; determining which of the rules are ready to fire by matching the predicate conditions of each rule with the conditions of said set; enabling said node means to simultaneously fire those of the rules ready to fire which are defined by said P representation as being free of input and output dependencies; and communicating from each node enabled by said enabling step the alteration of conditions by the corresponding rule to other nodes whose rules are defined by said C matrix means as being input or communication dependent upon the rule of said enabled node.

17 Claims, 3 Drawing Sheets

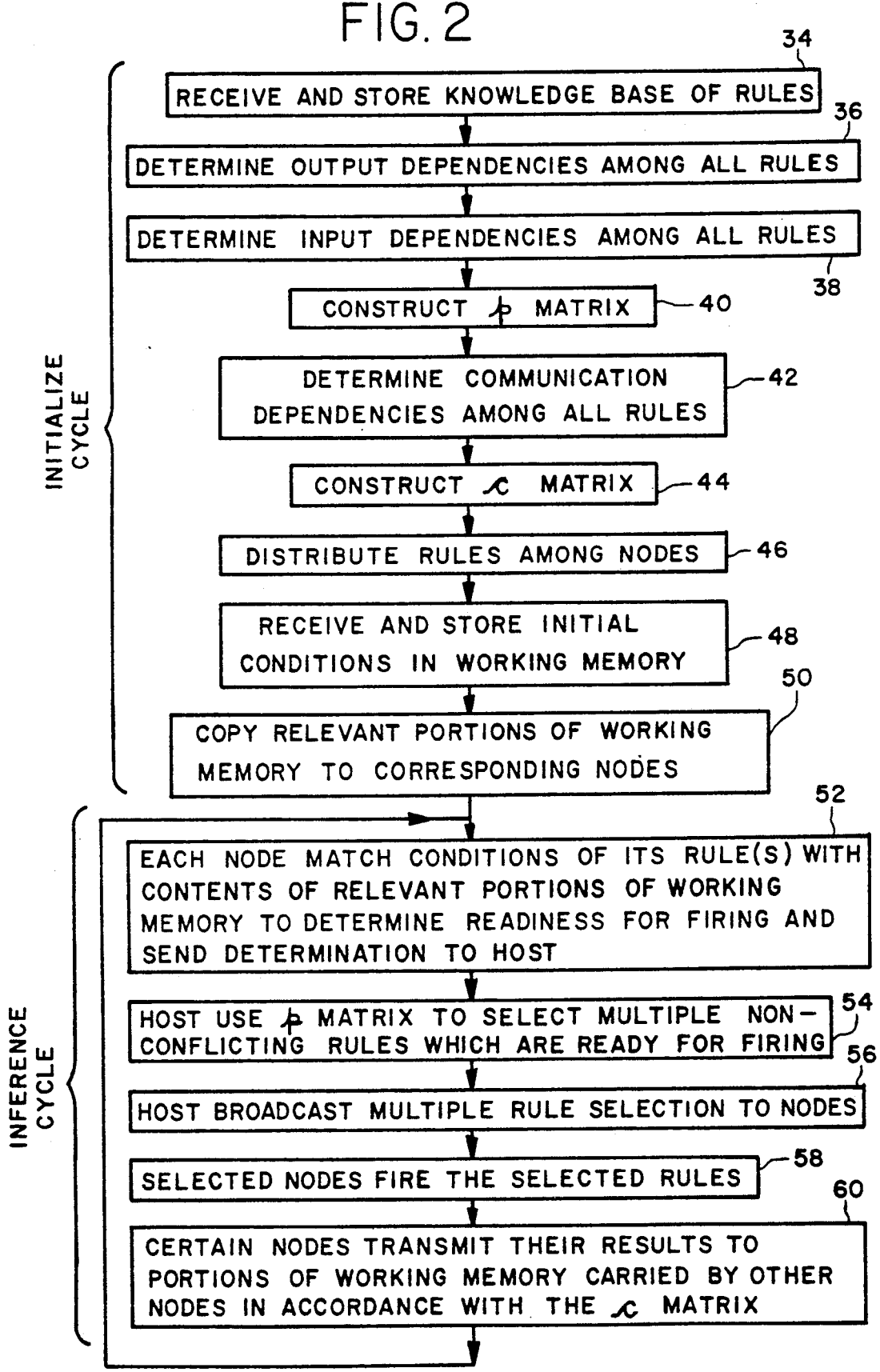

PARALLEL INFERENCING METHOD AND APPARATUS FOR RULE-BASED EXPERT SYSTEMS

ORIGIN ON THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

The invention analyzes a set of conditions with an expert knowledge base of rules using plural separate nodes which fire respective rules of said knowledge base, each of said rules upon being fired altering certain of said conditions predicated upon existence of others of said conditions, the invention operating by constructing a P representation of all pairs of said rules which are input dependent or output dependent; constructing a C representation of all pairs of said rules which are communication dependent or input dependent; determining which of the rules are ready to fire by matching the predicate conditions of each rule with the conditions of said set; enabling said node means to simultaneously fire those of the rules ready to fire which are defined by said P representation as being free of input and output dependencies; and communicating from each node enabled by said enabling step the alteration of conditions by the corresponding rule to other nodes whose rules are defined by said C matrix means as being input or communication dependent upon the rule of said enabled node.

Rule-based expert systems of the conventional type are implemented in a computer having a memory storing a knowledge base. The knowledge base is a set of rules, each defining a result predicated upon a specific set of conditions being met in a predetermined manner. Such rules are, in effect, a set of "If . . . , then . . ." statements. The predicate conditions upon which each rule is based (i.e., the "IF" clause of the rule) may be represented by computer-language statements. A set of actual conditions observed or measured which are to be analyzed by the expert system are stored as data in the working memory of the computer. In their simplest form, such conditions may be binary true/false data, for example. Whenever conditions called for in the IF clause of a rule are satisfied (or "true"), executing or "firing" the rule changes certain other conditions specified in the THEN clause of the rule, for example by changing such conditions from "false" to "true" or vice versa.

During the inferencing cycle, the first phase or step performed by the expert system is to attempt to match the predicate conditions (the IF clause) of each rule with the contents of the working memory. A rule is ready to be "fired" if all of its predicate conditions are met by the contents of the working memory. The next step is to identify any conflicts which may exist between the various rules which are ready to be fired and select the next rule to be fired. Two rules are conflicting if the result (THEN statement) produced by one rule affects conditions called for in the predicate (IF statement) of the other rule. Two rules are also conflicting if their results change the same condition differently. In either case, anomalous results would be obtained if the conflicting rules were fired using the same working memory contents. Various well-known techniques are used to select the "best" rule to be fired next. Then, all rules which do not conflict with the best rule may also be fired in rapid sequence thereafter without updating the contents of the working memory. In some techniques, not all of the non-conflicting rules are necessarily fired.

Such experts systems have been described, for example, in U.S. Pat. Nos. 4,837,735 (to Allen, Jr., et al.), 4,783,752 (to Kaplan et al.), 4,849,905 (to Loeb et al.), 4,847,784 (to Clancey), 4,809,219 (to Ashford et al.), 4,868,763 (to Masui et al.), 4,754,409 (to Ashford et al.) and 4,763,277 (to Ashford et al.).

United Kingdom published application number 2,207,531A discloses an expert system using similar techniques but which allocates execution of each of the rules to separate parallel processors or nodes. This type of parallel system is intended for achieving speedup in the match phase of the expert system inferencing cycle by storing the results of the matching phase in accordance with a Rete algorithm. However, such parallel processor systems have not achieved anticipated execution speed increases, and in fact have generally achieved only a five-fold speed increase over non-parallel or sequential implementations. This can be explained in part because such expert systems are written in serial languages and designed to exploit only obvious sources of parallelism.

One problem is that they achieve maximum speed (number of rule firings per cycle) only if there are many non-conflicting rules that can be fired without updating the working memory. After each cycle, the working memory must be updated from the results of each rule fired during the cycle and the next cycle begins by performing the matching phase and the conflict resolution and rule selection phase, a time consuming task.

A new approach is needed to out-perform parallel implementations (as exemplified in the above-referenced United Kingdom application) for knowledge bases containing hidden parallelism among rules, having high variable densities within rules, or exhibiting significant changes to working memory in individual inferencing cycles.

Accordingly, it is an object of the invention to exploit hidden parallelism among rules in an expert system.

It is a further object of the invention to provide a system which does not require performing conflict resolution tasks with each inferencing cycle.

It is another object of the invention to provide an expert system which does not perform the conflict resolution phases at run time.

It is a yet further object of the invention to provide a system which distributes the rule condition matching tasks among parallel nodes during the inferencing cycle, whereby it is unnecessary to use a Rete-based algorithm to store the results of the matching phase.

It is another object of the invention to provide an expert system which exploits hidden parallelism among rules and is faster than Rete algorithm-based parallel systems.

It is still another object of the invention to detect and analyze inter-rule dependencies to detect hidden parallelism prior to run time and to exploit this parallelism to achieve substantial increases in execution speed with respect to prior art systems.

It is a still further object of the invention to partially distribute the results of such analysis of inter-rule dependencies, the working memory of rule conditions, the knowledge base of rules and the inferencing cycle operation among nodes in an expert system.

It is yet another object of the invention to provide an expert system having intelligently interconnected nodes among which a knowledge of inter-rule dependencies is partially distributed.

These and other objects and benefits of the invention will become apparent from the detailed description given below when taken in conjunction with the accompanying drawings.

SUMMARY OF THE INVENTION

The invention is an expert system having plural separate node apparatus for firing respective rules of a knowledge base with respect to a set of conditions stored in memory apparatus, each of the rules upon being fired altering certain of the conditions predicated upon existence of others of the conditions, and matching apparatus for determining which of the rules are ready to fire by matching the predicate conditions of each rule with the conditions in the memory apparatus, the expert system comprising predeterminable P matrix apparatus for representing which of the rules are input dependent or output dependent upon one another; predeterminable C matrix apparatus for representing which of the rules are communication dependent or input dependent upon one another; selection apparatus coupled to the P matrix apparatus for enabling the node apparatus to simultaneously fire those of the rules ready to fire which are defined by the P matrix apparatus as being free of input and output dependencies; and parallel node communication apparatus coupled to the C matrix apparatus for communicating from each node enabled by the selection apparatus the alteration of conditions by the corresponding rule to other nodes whose rules are defined by the C matrix apparatus as being input or communication dependent upon the rule of the enabled node, whereby the system may simultaneously fire rules which are communication dependent.

The memory apparatus comprises plural node memory apparatus distributed among the plural nodes, each of the node memory apparatus for storing at a respective node a sub-set of the conditions comprising the predicate conditions of the rule of the respective node, whereby the communication means transmits from each enabled node the alteration of conditions by the corresponding rule to the node memory apparatus of other nodes specified by the C matrix apparatus upon the firing of the rules of the enabled nodes. The C matrix apparatus comprise plural C vector apparatus distributed among the plural nodes, each of the plural C vector apparatus for defining node destinations for transmitting from a respective node the alteration of conditions by the respective rule. The communication apparatus comprise plural communicator apparatus distributed among the plural nodes, each of the plural communicator apparatus for transmitting the alteration of conditions by the respective rule to destination nodes called for by the respective C vector apparatus. The matching apparatus comprise plural match apparatus distributed among the plural nodes, each of the plural match means for determining whether the predicate conditions of the corresponding rule match the contents of the corresponding node memory apparatus. The plural nodes apparatus each comprise a data microprocessor means, the data microprocessor means for storing and executing instructions embodying a corresponding one of the rules.

The communicator apparatus of each node comprise an input/output microprocessor apparatus connected to the corresponding data microprocessor apparatus for transmitting the corresponding alteration of conditions to input/output processors of other nodes in accordance with the corresponding C vector. The selection apparatus and the P matrix apparatus are comprised in a host computer. The expert system further comprises a working memory in the host computer containing all of the conditions, wherein each of the node memory apparatus comprise a copy of portions of the working memory containing predicate conditions of the corresponding rule. The P matrix comprises a plurality of elements $p_{i,j}$, each of which equals a first value if firing the rule of the $i^{th}$ node deletes predicate conditions of the rule of the $j^{th}$ node or deletes conditions added by the firing of the rule of the $j^{th}$ node, and equals a second value otherwise. The C matrix apparatus comprises a plurality of elements $c_{i,j}$, each of which equals a first value if the predicate conditions of the $i^{th}$ rule contains conditions that are added or deleted by the firing of the $j^{th}$ rule, whereby the system refrains from simultaneously firing rules that are input or output dependent but does simultaneously fire rules which are communication dependent but not input or output dependent, whereby to exploit the parallelism of communication dependent rules. The matching apparatus, the selection apparatus and the apparatus for firing rules are comprised in a distributed inference engine, the distributed inference engine comprising a host inference engine in the host computer and a plurality of node inference engines, the host inference engine comprising the selection apparatus, the plurality of node inference, engines comprising the plurality of matching apparatus and the plural node apparatus for firing the rules. The selection apparatus comprise broadcasting apparatus for broadcasting to the nodes the rules selected for firing by the selection apparatus.

DESCRIPTION OF THE DRAWINGS

FIG. 2 is a flow diagram illustrating the operation of the system of FIG. 1.

DETAILED DESCRIPTION OF THE INVENTION

Figure 1:
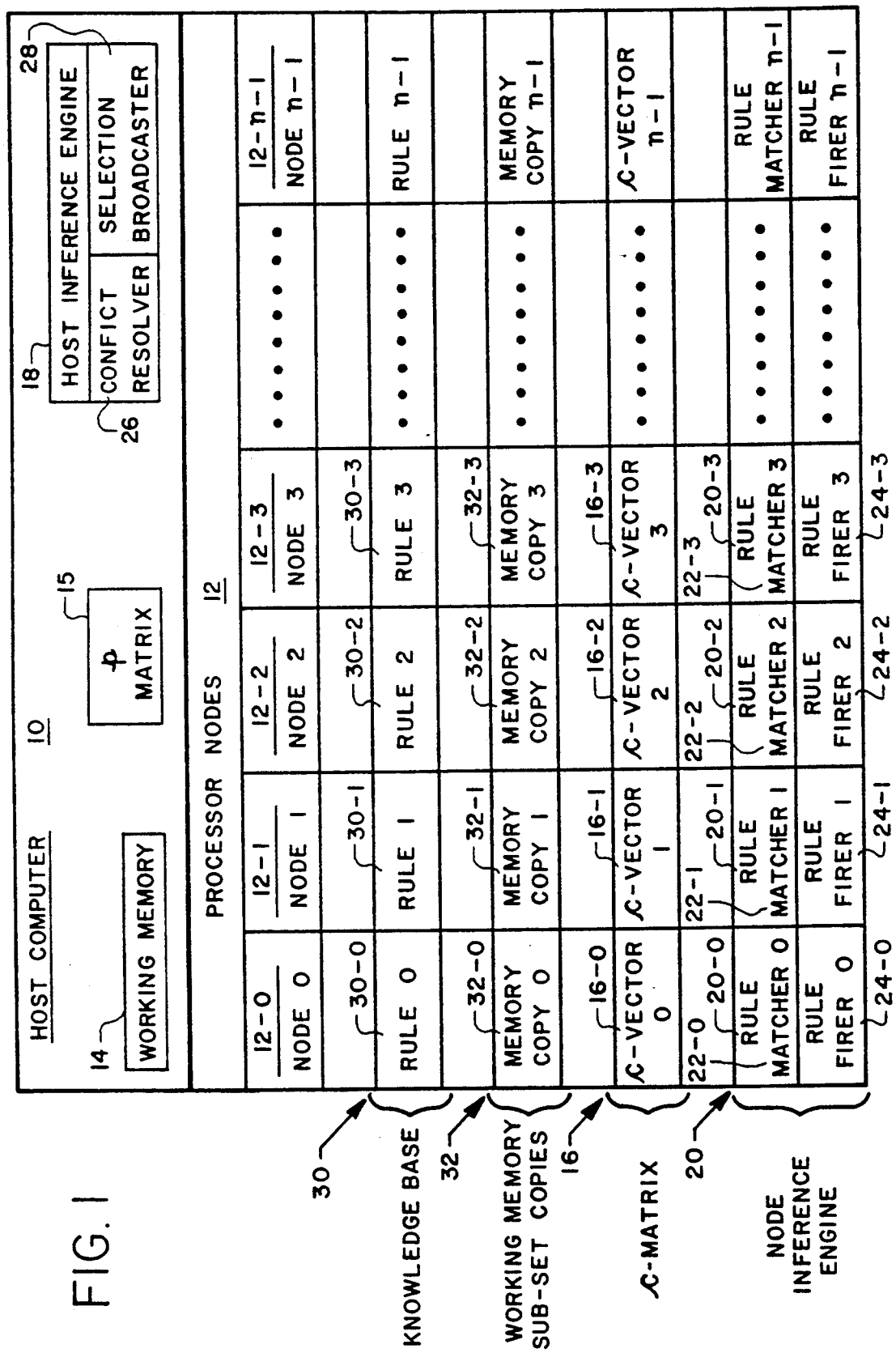
FIG. 1 is a block diagram of an expert system embodying the present invention.

Referring to FIG. 1, the expert system of the invention includes a host computer 10 and a set 12 of n interconnected parallel nodes generally denoted 12-0, 12-1, 12-2, 12-3, etc. Each one of a set of rules comprising an expert knowledge base is fired (i.e., executed) by a corresponding one of the nodes 12. A working memory 14 stores a set of conditions to which the rules respond by changing (e.g., adding or deleting) various ones of the conditions. Prior to performing successive inferencing cycles, the expert system of the invention first detects and analyzes inter-rule dependencies in the knowledge base to detect hidden parallelism. The results of this analysis are partially distributed among the nodes 12 and in the host computer 10. Then, during successive inferencing cycles ("run time"), the system of the invention exploits this parallelism to achieve substantial execution speedup.

In the analysis conducted prior to run time, dependencies among rules are used to reveal inherent parallelism and communication requirements. In one embodiment, this may be accomplished by the host computer 10 in accordance with the initializing portion of the process illustrated in FIG. 2. These dependencies include input dependence, output dependence and communication dependence. For example, two rules are input dependent if firing (i.e., executing) one of the rules deletes working memory elements that match conditions of the other rule. Two rules are output dependent if working memory elements that are added in the firing of one rule are deleted in the firing of the other rule. Two rules are communication dependent if the predicate conditions of one rule contains conditions that are added to the working memory whenever the other rule is fired. As one possible example, deleting a condition entails changing that condition from a "true" status to a "false" status, while adding a condition entails changing that condition from a "false" status to a "true" status. A P matrix 15 to be described below indicates which pairs of rules are input or output dependent. A C matrix 16 indicates which pairs of rules are either communication or input dependent. In one embodiment, each element $p_{i,j}$ of the P matrix equals zero if the $i^{th}$ rule and the $j^{th}$ rule are neither input dependent nor output dependent, and equals one otherwise. Further, each element $c_{i,j}$ of the C matrix equals zero if the $i^{th}$ rule and the $j^{th}$ rule are neither communication dependent nor input dependent and equals one otherwise.

The P matrix defines for all inferencing cycles all conflicts (i.e., all input and output dependencies) in the knowledge base which preclude simultaneous firings of certain rules. The predetermination of the P matrix prior to run time eliminates the need to perform conflict resolution tasks during the inferencing cycle, in the sense that the rules need not be re-analyzed. Instead, the host computer 10 simply refers to the P matrix 15 each time it selects rules to be fired, thus achieving a significant savings in time and a proportional increase in inferencing cycle execution speed.

The C matrix defines the hidden parallelism exploited by the expert system of the present invention. Specifically, while the invention refrains from simultaneously firing rules which the P matrix indicates are either input or output dependent, the invention does simultaneously fire rules which are only communication dependent (as well as rules having no mutual dependencies, of course). As will be seen below, this is accomplished by storing in each node all of the conditions relating to the predicate (IF clause) of the node's rule and requiring each node which has fired its rule to immediately independently transmit its results to all other nodes indicated by the C matrix to contain rules which are communication or input dependent with the rule of the transmitting node. Such transmissions are carried out virtually simultaneously in parallel by all nodes required by the C matrix to transmit their results.

By way of comparison, the prior art generally cannot simultaneously fire rules which are communication dependent only. Thus, the invention exploits a hidden parallelism in the knowledge base of rules to achieve a significant advantage in execution speed over the prior art.

Figure 3:
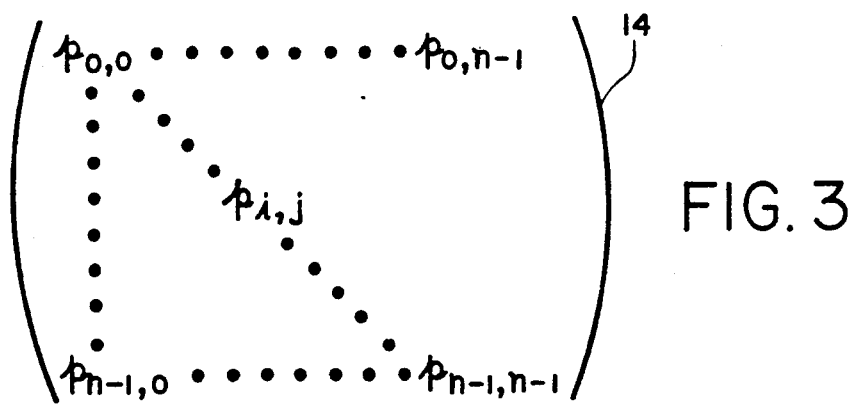
FIG. 3 is a symbolic representation of a parallelism matrix employed in the system of FIG. 1.
Figure 4:
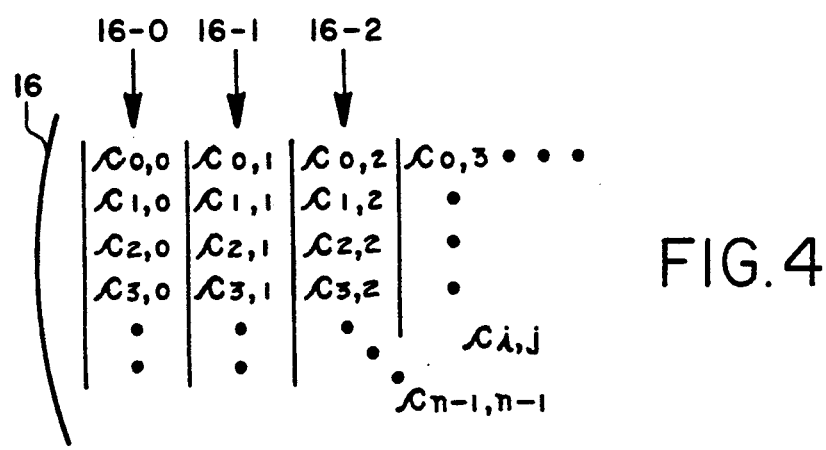
FIG. 4 is a symbolic representation of a communication matrix employed in the system of FIG. 1.

The P matrix 15 (see FIG. 3) is stored in the host computer 10 while the C matrix 16 (see FIG. 4) is distributed among the nodes 12. Each node 12 stores the corresponding one of the vectors, 16-0, 16-1, 16-2, etc. of the C matrix 16. The $i^{th}$ vector of the C matrix defines the communication dependence of the rule fired by the $i^{th}$ node 12-i with the rules fired by all other nodes 12. The nodes 12 define a among which the C matrix, the knowledge base rules and a copy of the working memory 14 are distributed, as will now be described.

In accordance with the invention, the operation of the inferencing cycle is distributed among the nodes 12 and the host processor 10. The inference engine of the invention is divided among a host inference engine 18 and node inference engines 20 distributed among the nodes 12. Each node inference engine 20-0, 20-1, 20-2, etc. includes a rule matcher 22-0, 22-1, 22-2, etc., and a rule firer 24-0, 24-1, 24-2, etc. The host inference engine 18 includes a conflict resolver 26 and a selection broadcaster 28. The knowledge base 30 comprises n rules (or stored instructions for the n rule firers 24) 30-0, 30-1, 30-2, etc. distributed among corresponding ones of the nodes 12. A copy 32 of the working memory 14 comprises n working memory subsets 32-0, 32-1, 32-2 distributed among corresponding ones of the nodes 12. Each node 12-i has its own memory subset 32-i which contains a copy of only those portions of the working memory 14 containing conditions called for by predicate of the rule 30-i of the node 12-i.

Operation of the system of FIG. 1 will now be described with reference to the flow diagram of FIG. 2. Prior to run time, the system of FIG. 1 prepares itself in an initialization cycle performed, in one embodiment, by the host computer 10 as follows. The knowledge base is stored in the system (block 34 of FIG. 2) and the input and output dependencies among all pairs of rules in the knowledge base are deduced (blocks 36 and 38 of FIG. 2) and used to construct the parallelism matrix, P (block 40 of FIG. 2). The communication dependencies between all pairs of rules are deduced (block 42) and used along with the input dependencies to construct the communication matrix, C (block 44). Each of the rules 30 in the knowledge base is assigned to one of the nodes 12 (block 46 of FIG. 2). This may be performed automatically by the host computer 10, for example. It is possible for one node 12 to be assigned more than one rule. The rules are distributed among the nodes 12 in such a manner as to maximize parallelism. Thus, rules that can be fired simultaneously according to the P matrix 15 should not be located in the same node. Furthermore, rules that must exchange information after firing according to the C matrix 16 should be located in nodes with minimum communication distances. The host computer 10 may employ heuristic techniques to optimize allocation of the rules among the nodes 12.

Upon storing in the working memory 14 the set of conditions which the expert system is to analyze (block 48 of FIG. 2), the host 10 determines which portions or subsets of the working memory 14 contain conditions called for in the predicate of each rule. The relevant working memory subsets are then copied and stored in the working memory sub-sets 32 of appropriate ones of the nodes 12 (block 50 of FIG. 2).

In order to achieve simultaneous rule firings, the system of FIG. 1 performs an inference cycle comprising:
(1) match predicate statement of each rule with the conditions stored in the working memory;
(2) select multiple rules;
(3) broadcast selections to the nodes; and (4) fire the selected rules.

The selected rules may be any set of rules that have no input or output dependencies among each other, as defined by the P matrix. However, various techniques are known for selecting a "best" rule to be fired. In the invention, this permits all other rules having no input or output dependencies with the "best" rule or with each other to be fired simultaneously. Thus, selecting the "best" rule determines the entire set of rules which may be fired without conflict in the current inference cycle, although the entire set is not necessarily used. The "best" rule may be selected as the first rule to enter the set, the rule with the highest pre-specified priority in the set, the rule with the largest number of predicate condition elements or a rule that has not previously been fired. In a system custom-designed for a given application, rule selection is usually achieved by a combination of these techniques, or by heuristic techniques, as is well known.

The inferencing cycle begins by the rule matcher 22 in each node 12 attempting to match each predicate condition called for by its corresponding rule 30 to the contents of its working memory subset 32 to determine whether all conditions required by its rule 30 are present (block 52 of FIG. 2). Any rule for which all the elements of its predicate condition appear in the corresponding working memory subset 32 (i.e., all the elements are "true") is eligible to fire. This determination is transmitted to the conflict resolver 26 in the host computer 10.

The conflict resolver 26 does not analyze the rules but merely uses the P matrix to immediately identify all conflicts (i.e., input dependencies and output dependencies) among all the eligible rules (block 54 of FIG. 2). Then, using one of the conventional techniques mentioned hereinabove, the conflict resolver 26 finds one of the eligible rules to be the "best" rule. The conflict resolver 26 then transmits a list giving the identity of the best rule as well as all other eligible rules which do not conflict according to the P matrix 16 to the selection broadcaster 28. The selection broadcaster 28 then requests each node 12 whose rule is named on the list to enable its rule firer 24 (block 56 of FIG. 2).

The rule firers 24 of the selected nodes 12 then fire by executing the instructions of their respective rules 30 (block 58 of FIG. 2). The conditions generated by the operation of each rule firer 24 (i.e., the addition of new conditions or the removal of existing conditions in accordance with the rule's THEN clause) are transmitted to the working memory sub-sets 32 specified by the corresponding C vector 16 (block 60 of FIG. 2). For example, if the $j^{th}$ element of the $i^{th}$ C vector, namely $c_{i,j}$, equals one, then the conditions generated by the $i^{th}$ rule firer 24-i are transmitted to the $j^{th}$ memory sub-set 32-j. All of the nodes transmitting their results to other nodes specified by the C matrix do so virtually simultaneously in parallel using well known techniques.

Thus, the nodes 12 are interconnected in accordance with the communication dependencies of the rules. The system is then ready for the next inference cycle without having to perform any conflict resolution tasks, even though many of the eligible rules may be communication dependent upon one another, a significant advantage over the prior art.

Figure 5:
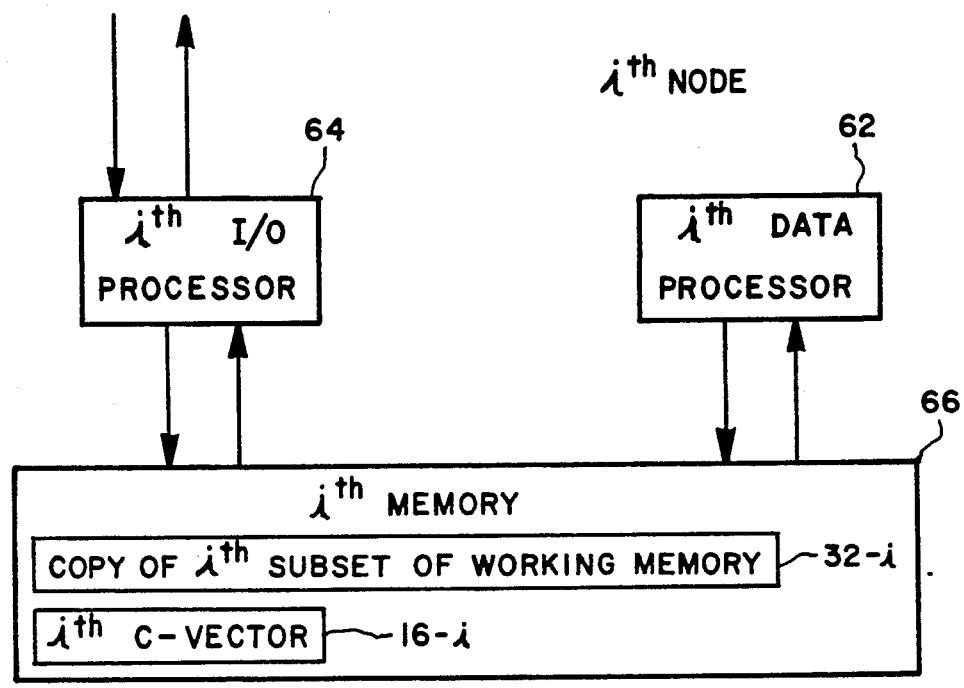
FIG. 5 is a block diagram of a typical node in the system of FIG. 1.

The common structure of each of the nodes 12 is illustrated in FIG. 5. The rule firer 24 and the rule matcher 22 are implemented by a data microprocessor 62. The corresponding rule 30 is contained in microinstructions stored in a read-only memory (not shown) governing operation of the data microprocessor 62. The data microprocessor 62 communicates with all other nodes in accordance with its C vector 16 and with the host computer 10 through an I/O processor 64, which may be connected to the other nodes via a common bus (not shown), for example, in accordance with well-known techniques. A memory 66 connected to the processors 62 and 64 stores the C vector 16 and the working memory subset 32 for the particular node 12.

Wherefore, having thus described the invention, what is claimed is:

1. An expert system operating in successive inferencing cycles and having a host connected to plural separate node means for firing respective rules of a knowledge base with respect to a set of conditions, each of sad rules upon being fired altering certain of said conditions predicated upon existence of others of said conditions, each of said node means comprising matching means for determining which of the rules are ready to fire by matching the conditions of each rule with said set of conditions, said expert system comprising:

predeterminable P matrix means for storing a predeterminable P matrix in said host, said predeterminable P matrix comprising means for representing which of said rules are input dependent or output dependent upon one another;

predeterminable C matrix means for storing a predeterminable C matrix in each of said node means, said predeterminable C matrix comprising means for representing which ones of the rules of a respective node means are communication dependent or input dependent upon other rules;

selection means in said host coupled to said P matrix means for selecting for said node means to simultaneously fire during a current inference cycle ones of the rules ready to fire which are defined by said P matrix means as being free of input and output dependencies and for broadcasting the selection of said rules to all of said node means for firing during said current inference cycle; and parallel node communication means in each of said node means coupled to a respective one of said C matrix means for communicating from each node enabled by said selection means alteration of said conditions by the corresponding rule to other nodes whose rules are defined by respective C matrix means as being input or communication dependent upon the rule of said enabled node, wherein said node means comprise means for firing rules which are communication dependent during the same inference cycle.

2. The system of claim 1 wherein said memory means comprises:

plural node memory means distributed among said plural nodes, each of said node memory means for storing at a respective node those of said conditions corresponding to each rule of the respective node, wherein said communication means comprises means for transmitting from each enabled node alteration of said conditions by the corresponding rule to the node memory means of other nodes specified by said C matrix means upon the firing of the rules of the enabled node.

3. The expert system of claim 1 wherein said matching means comprise plural match means distributed among said plural nodes, each of said plural match means comprising means for determining whether the conditions of the corresponding rule match the contents of the corresponding node memory means.

4. The system of claim 1 wherein said C matrix means for storing a predeterminable C matrix comprise C vector means for storing plural C vectors distributed among said plural nodes, each of said plural C vectors comprising means for defining node destinations for transmitting from a respective node alteration of said conditions by the respective rule.

5. The system of claim 4 wherein said communication means comprise plural communicator means distributed among said plural nodes, each of said plural communicator means for transmitting alteration of said conditions by said respective rule to destination nodes called for by corresponding C vectors.

6. The expert system of claim 5 wherein said plural nodes means each comprise a data microprocessor means, said data microprocessor means for storing and executing instructions embodying a corresponding one of said rules.

7. The expert system of claim 6 wherein said communicator means of each node comprise an input/output microprocessor means connected to the corresponding data microprocessor means for transmitting the corresponding alteration of conditions to input/output processors of other nodes in accordance wit the corresponding C vector.

8. The expert system of claim 1 further comprising a working memory in said host containing all of said conditions, wherein each of said node memory means comprise a copy of portions of said working memory containing predicate conditions of the corresponding rule.

9. The expert system of claim 1 wherein said P matrix means for storing a predeterminable P matrix comprises means for storing a plurality of elements $p_{i,j}$, each of which equals a first value if firing the rule of the $i^{th}$ node deletes predicate conditions of the rule of the $j^{th}$ node or deletes conditions added by the firing of the rule of the $j^{th}$ node, and equals a second value otherwise.

10. The expert system of claim 1 wherein said C matrix means for storing a predeterminable C matrix comprises means for storing a plurality of elements $c_{i,j}$, each of which equals a first value if the predicate conditions of the $i^{th}$ rule contains conditions that are added or deleted by the firing of the $j^{th}$ rule, whereby said system refrains from simultaneously firing rules that are input or output dependent but does simultaneously fire rules which are communication dependent but not input or output dependent, whereby to exploit the parallelism of communication dependent rules.

11. The expert system of claim 1 wherein said matching means, said selection means and said node means are comprised in a distributed inference engine, said distributed inference engine comprising a host inference engine in said host and a plurality of node inference engines, said host inference engine comprising said selection means, said plurality of node inference engines comprising said plural node means.

12. A method for analyzing a set of conditions with an expert knowledge base of rules using plural separate node means for firing respective rules of said knowledge base, said node means being connected to a host computer, each of said rules upon being fired altering certain of said conditions predicated upon existence of others of said conditions, said method comprising:

constructing by said host computer a P representation of all pairs of said rules which are input dependent or output dependent;

constructing by said host computer a C representation of all pairs of said rules which are communication dependent or input dependent;

allocating by said host computer said rules and corresponding portions of said C representation among respective ones of said node means;

performing successive inferencing cycles, each of said inferencing cycles comprising the following steps:

determining by said node means which of the rules are ready to fire by matching the conditions of each rule with the conditions of said set and communicating to said host computer from each of said node means the identity of the rules ready to fire;

selecting by said host computer for firing by said node means ones of the rules ready to fire which are defined by said P representation as being free of input and output dependencies and broadcasting the selected rules to said nodes; and communicating from each node enabled by said enabling step alteration of said conditions by the corresponding rule to other nodes whose rules are defined by said C matrix means as being input or communication dependent upon the rule of said enabled node, wherein said method further comprises firing in said node means at least some of the rules which are communication dependent during a current inferencing cycle.

13. The method of claim 12 further comprising:

after said allocating step, storing at each node a subset of said set of conditions, said sub-set comprising the conditions of the rule of the respective node, wherein said communicating step comprises transmitting from each node enabled by said enabling step the alteration of conditions by the corresponding rule to other nodes specified by said C representation.

14. The method of claim 13 wherein said matching step comprises matching the conditions of each rule with the sub-set of conditions stored in the corresponding node, and carrying out said matching step for all of said rules simultaneously.

15. The method of claim 12 wherein said communicating step comprises transmitting alteration of said conditions by said respective rule to destination nodes called for by the respective C vector means.

16. The method of claim 12 wherein said step of constructing said P representation comprises storing in said host computer a plurality of elements $p_{i,j}$, each of which equals a first value if firing the rule of the $i^{th}$ node deletes predicate conditions of the rule of the $j^{th}$ node or deletes conditions added by the firing of the rule of the $j^{th}$ node, and equals a second value otherwise.

17. The method of claim 12 wherein said step of constructing said C representation comprises storing in said host computer a plurality of elements $c_{i,j}$, each of which equals a first value if the conditions of the $i^{th}$ rule contains conditions that are added or deleted by the firing of the $j^{th}$ rule, whereby said method comprises refraining from firing rules that are input or output dependent during a single inferencing cycle and comprises firing rules which are communication dependent but not input or output dependent during a single inferencing cycle.

* * * * *